(12) United States Patent
Cornelius et al.

(10) Patent No.: US 6,779,096 B1
(45) Date of Patent: Aug. 17, 2004

(54) METHOD AND APPARATUS FOR A CALIBRATED VARIABLE PHASE OFFSET TIMING BETWEEN SYNCHRONOUS CLOCK SUBDOMAINS

(75) Inventors: William Cornelius, Los Gatos, CA (US); Minoru Taoyama, San Jose, CA (US); Paul Thompson, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 379 days.

(21) Appl. No.: 09/969,970

(22) Filed: Sep. 29, 2001

(51) Int. Cl.[7] .............................................. G06F 12/00
(52) U.S. Cl. ........................ 711/167; 711/105; 713/401; 713/500
(58) Field of Search ................................. 711/105, 167; 713/401, 500

(56) References Cited

U.S. PATENT DOCUMENTS

| | | | | |
|---|---|---|---|---|
| 3,633,174 A | * | 1/1972 | Griffin ........................ 714/745 |
| 6,026,050 A | * | 2/2000 | Baker et al. ................ 365/233 |
| 6,334,174 B1 | * | 12/2001 | Delp et al. ................... 711/167 |
| 6,553,472 B2 | * | 4/2003 | Yang et al. .................. 711/167 |
| 6,646,953 B1 | * | 11/2003 | Stark ........................... 365/233 |
| 2003/0084233 A1 | * | 5/2003 | Williams .................... 711/105 |

* cited by examiner

Primary Examiner—Hiep T. Nguyen
(74) Attorney, Agent, or Firm—Blakely, Sokoloff, Taylor & Zafman LLP

(57) ABSTRACT

A method and apparatus for a calibrated variable phase offset timing between synchronous clock subdomains is described. In one embodiment, the invention is an apparatus. The apparatus includes a first subsystem and a second subsystem coupled to the first subsystem. The apparatus also includes a clock signal generator coupled to the first subsystem and coupled to the second subsystem. The clock signal generator is to supply a first clock to the first subsystem and to supply a second clock to the first subsystem and to supply a third clock to the second subsystem. Each of the first clock, the second clock and the third clock are derived from a common clock, the first clock having a first predetermined phase offset relative to the third clock, and the second clock having a second predetermined phase offset relative to the third clock. The first predetermined phase offset and the second predetermined phase offset are adjustable based on performance characteristics of the first subsystem and performance characteristics of the second subsystem.

32 Claims, 14 Drawing Sheets

|   | A | B | C | D |
|---|---|---|---|---|
| 0 | InValid | InValid | InValid | InValid |
| 1 | InValid | InValid | InValid | InValid |
| 2 | Valid | InValid | Valid | Valid |
| 3 | Valid | InValid | Valid | Valid |
| 4 | Valid | Valid | Valid | InValid |
| 5 | Valid | Valid | Valid | InValid |
| 6 | Valid | Valid | Valid | InValid |
| 7 | InValid | InValid | InValid | InValid |
| 8 | InValid | InValid | InValid | InValid |
| 9 | InValid | InValid | InValid | InValid |

FIG. 7A

|   | A | B | C |
|---|---|---|---|
| 0 | InValid | InValid | InValid |
| 1 | InValid | InValid | InValid |
| 2 | InValid | InValid | InValid |
| 3 | Valid | InValid | Valid |
| 4 | Valid | Valid | InValid |
| 5 | Valid | Valid | InValid |
| 6 | InValid | InValid | InValid |
| 7 | InValid | InValid | InValid |

FIG. 7B

METHOD AND APPARATUS FOR A CALIBRATED VARIABLE PHASE OFFSET TIMING BETWEEN SYNCHRONOUS CLOCK SUBDOMAINS

BACKGROUND OF THE INVENTION

1. Field of the Invention

This application relates generally to the fields of computer architecture and calibration and more specifically to tuning of performance parameters within a system based on characteristics of an individual system.

2. Description of the Related Art

Timing in modern computer systems is typically set with the worst-case timing margins for a set of components and the overall design as the starting point. Thus, even systems that have fast components and light bus loading may have timing parameters which are appropriate for systems with significantly different and significantly more components. In the case of some computers, timing parameters are set such that the timing will work in situations where extra components are added to the system, even though some such systems may never have the extra components in question.

By choosing the worst-case timing parameters, every system may be expected to operate as specified, but no system will take advantage of conditions allowing for enhanced performance. Timing parameters such as clock offsets may be set based on worst-case setup and hold times, even though a single component may not possibly have both a worst-case setup time and a worst-case hold time. Thus, it may be advantageous to allow for calibration or setting of time parameters based on an evaluation of components in a system at the time the system is running.

SUMMARY OF THE INVENTION

In one embodiment, the invention is an apparatus. The apparatus includes a first subsystem and a second subsystem coupled to the first subsystem. The apparatus also includes a clock signal generator coupled to the first subsystem and coupled to the second subsystem. The clock signal generator is to supply a first clock to the first subsystem and to supply a second clock to the first subsystem and to supply a third clock to the second subsystem. Each of the first clock, the second clock and the third clock are derived from a common clock, the first clock having a first predetermined phase offset relative to the third clock, and the second clock having a second predetermined phase offset relative to the third clock. The first predetermined phase offset and the second predetermined phase offset are adjustable based on performance characteristics of the first subsystem and performance characteristics of the second subsystem.

BRIEF DESCRIPTION OF THE DRAWINGS

The present invention is illustrated by way of example and not limitation in the accompanying figures.

FIG. 7A illustrates a table of results of a test of a system.

FIG. 7B illustrates another table of results of a test of a system.

DETAILED DESCRIPTION

Figure 1:
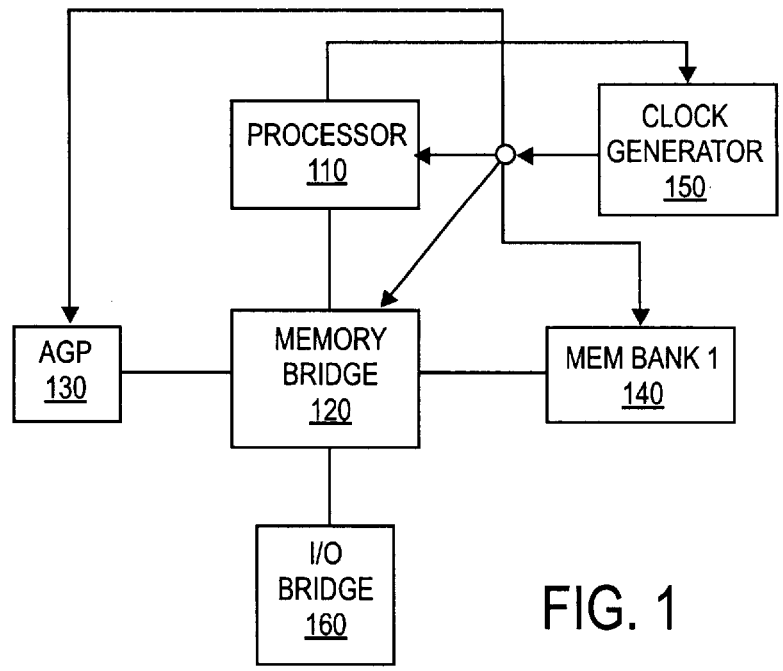
FIG. 1 illustrates an embodiment of a system.

A method and apparatus for a calibrated variable phase offset timing between synchronous clock subdomains is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A system and method of calibrated variable phase offset timing between synchronous clock subdomains is presented. The system may include a clock generator, a first subsystem and a second subsystem coupled together. The clock generator may generate various phases of a single clock, supplying a first phase of the clock to the first subsystem and a second phase of the clock to the second subsystem for example.

FIG. 1 illustrates an embodiment of a system. A processor 110 is coupled to a memory bridge 120 and to a clock generator 150. The memory bridge 120 is coupled to a memory bank 140, to an I/O bridge 160 and to an Accelerated Graphics Port (AGP) 130. The clock generator 150 is also coupled to AGP 130, memory bank 140, and the memory bridge 120. Note that the memory bridge 120 may be a north bridge, memory manager, control hub, or other similar device designed to provide an interface between a processor and other portions of a system. Furthermore, note that while the clock generator 150 is depicted as providing a single clock signal to all of the components, multiple clock signals may be provided, either by providing a single clock signal to each component, by providing clock signals to various groups of components, or by providing multiple clock signals to various components. Moreover, clock generator 150 is controlled by processor 110. In this embodiment, the loading on the memory bridge 120 may be said to be light, as it need only drive a single memory bank 140.

Figure 2:
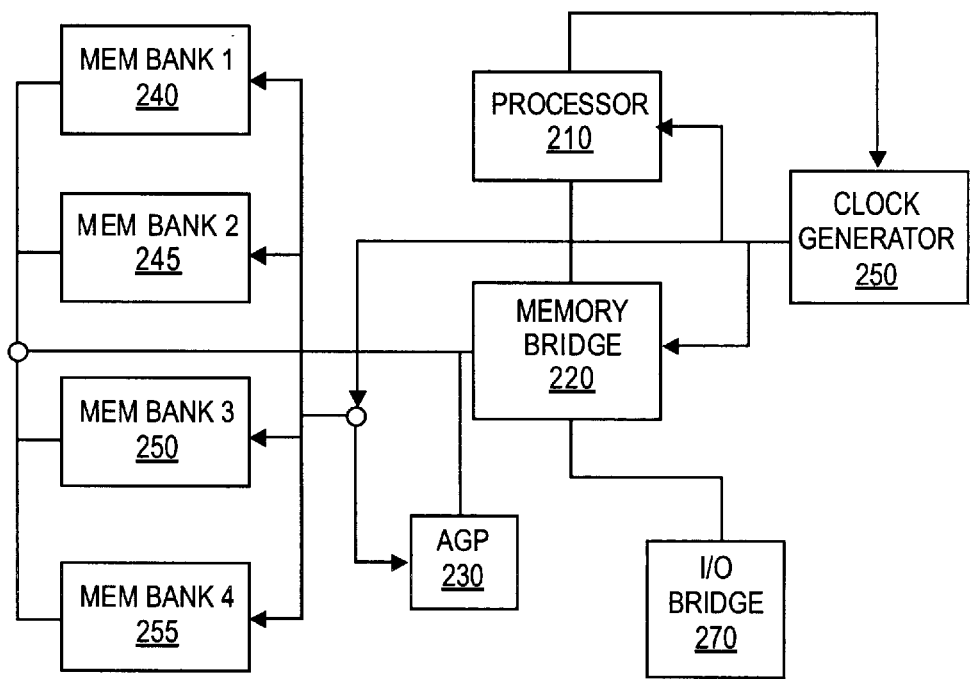
FIG. 2 illustrates an alternate embodiment of a system.

FIG. 2 illustrates an alternate embodiment of a system. A processor 210 is coupled to a memory bridge 220 and to a clock generator 250. The memory bridge 220 is also coupled to memory bank 240, memory bank 245, memory bank 250, memory bank 255, to an Accelerated Graphics Port (AGP) 230 and to an I/O bridge 270. The clock generator 150 is also coupled to AGP 230, memory bank 240, memory bank 245, memory bank 250, memory bank 255, and the memory bridge 220. As will be appreciated, while the system of FIG. 2 may be composed of similar components to the system of FIG. 1, the loading on the memory bridge 220 is heavy relative to the loading on memory bridge 120 of FIG. 1.

It will be appreciated that the clock scheme for each of the two systems illustrated so far may be significantly different. However, the two systems illustrated may also be different configurations of a single system design, thus requiring a single robust clock scheme which may work for both a heavy and a light load on a memory bridge, for example. Moreover, the clock scheme may include further design challenges related to process variations in manufacturing of the components (such as the processor and memory for example), variations in power supply voltage, variations in operating temperature, even variations in assembly and maintenance of the system after initial manufacturing. Thus, providing a robust and self-adjusting clock scheme may be useful.

Figure 3A:
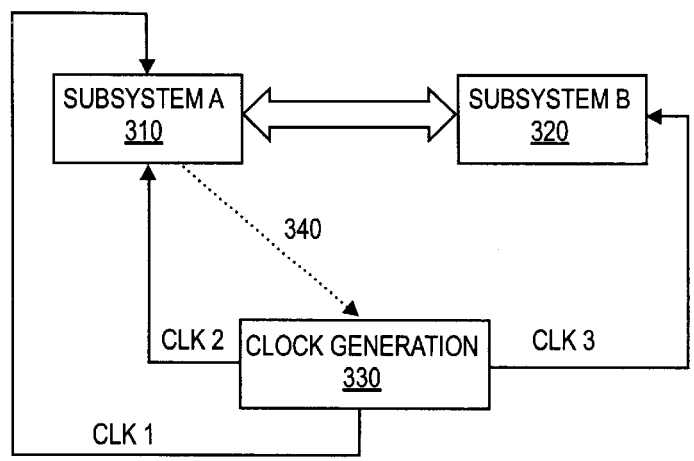
FIG. 3A illustrates another embodiment of a system.

FIG. 3A illustrates another embodiment of a system. Subsystem A 310 is coupled to subsystem B 320. Clock generation 330 provides a first clock (Clk 1) and a second clock (clk 2) to subsystem A 310 and a third clock (clk 3) to subsystem B 320. Moreover, subsystem A 310 uses link or coupling 340 to control clock generation 330.

In one embodiment, subsystem A 310 is a memory controller and subsystem B 320 is a SDRAM subsystem. The first clock is a read clock and the second clock is a write clock, while the third clock is the SDRAM clock. Each of the first clock, the second clock, and the third clock operate on the same duty cycle and frequency, but are phase shifted relative to each other. Thus, in one embodiment, the read clock operates at a phase after the SDRAM clock, allowing read data to depart the SDRAM subsystem and propagate to the memory controller at which point the read data is latched based on the read clock. Similarly, the write clock operates at a phase prior to the SDRAM clock, allowing the memory controller to output write data to the SDRAM based on the write clock, allowing the write data to propagate to the SDRAM, and allowing the write data to then be latched by the SDRAM based on the SDRAM clock.

Note that the data transfer times discussed herein may exceed one clock cycle in time, such that the early write clock and late read clock allow for propagation of data between the two subsystems at a faster clock rate than would appear to be possible based on the data transfer time in question. The data transfer or propagation time may include, components such as output time of the memory controller, buffer time, flight time on a bus or printed circuit board conductor, and input time required for the SDRAM (such as setup/hold time) for example.

As will be appreciated, adjustments in the phase differences between the various clocks may be suitable, based on the factors outlined above, such as loading, process variations, temperature, power supply, and others for example. Furthermore, making such adjustments at predictable times (rather than simply adjusting in the lab on a prototype), may allow for adaptation to changing conditions and improved performance.

Figure 3B:
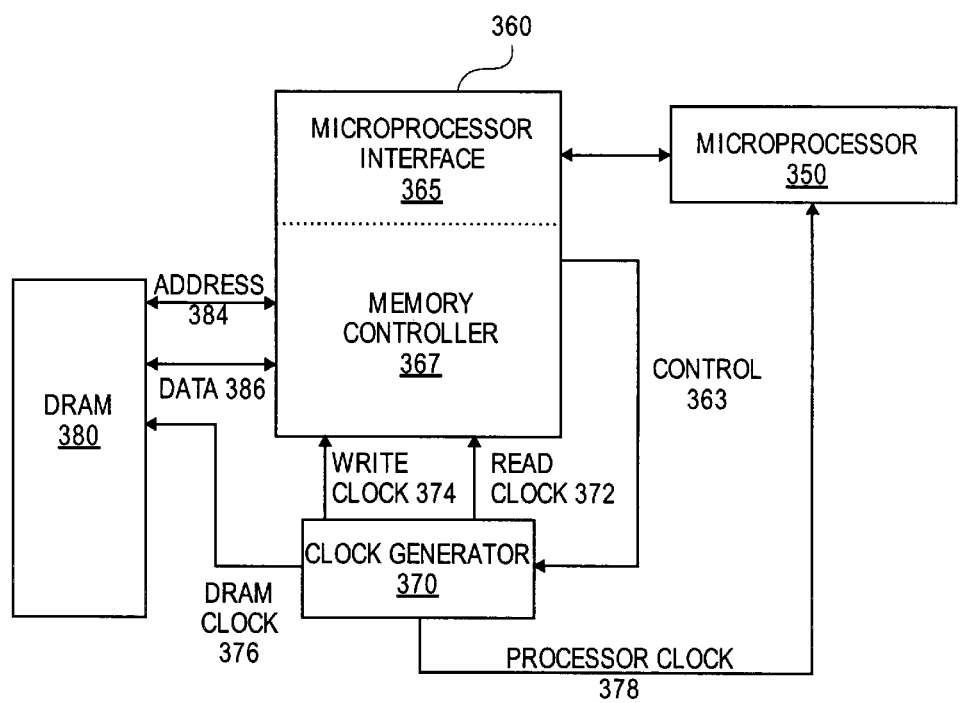
FIG. 3B illustrates still another embodiment of a system.

FIG. 3B illustrates still another embodiment of a system. Microprocessor 350 is coupled to control hub 360. Control hub 360 includes microprocessor interface 365 and memory controller 367, and may include other components. Memory controller 367 is coupled to clock generator 370 through control connection 363 and through read clock 372 and write clock 374. Clock generator 370 is also coupled to microprocessor 350 through processor clock 378 and to DRAM 380 through DRAM clock 376. DRAM 380 is also coupled to memory controller 367 through address bus 384 and data bus 386 (which may share physical conductors or may have separate physical conductors). Note that other (or additional) control lines and connections may be suitable for a particular implementation of such an embodiment.

In one embodiment, memory controller 367 determines suitable operating parameters for read clock 372, write clock 374 and DRAM clock 376. This determination is made by performing a write sweep of DRAM 380 using a series of sets of timing (operating) parameters. These timing parameters may include phase offsets (and potentially trim offsets) between pairs of the clocks, such as a phase offset between read clock 372 and DRAM clock 376, or between write clock 374 and DRAM clock 376 for example.

The write sweep may, in one embodiment, include writing a first set of values to a first set of memory locations based on a first set of write timing parameters, then proceeding to writing the first set of values to a second set of memory locations based on a second set of write timing parameters. By repeating this process, a series of values are written to memory, potentially with varying success depending on the timing parameters chosen. With the memory locations corresponding to sets of timing parameters, a determination can be made as to which sets of timing parameters are suitable for use by the memory controller 367. In part, the determination may be made by reading back data from these memory locations and comparing the read back data to expected data In an alternate embodiment, a read sweep is employed, too. The read sweep may involve reading a second set of values from the first set of memory locations using a first set of read timing parameters and comparing those values to the first set of values. By repeating this process for the second and succeeding sets of memory locations with a second and succeeding sets of read timing parameters, the memory controller 367 may determine a suitable set of read timing parameters. Note that simply reading all values expected to be present in memory may be a suitable solution in some embodiments, whereas reading only a selected portion of the expected values may be a suitable solution in other embodiments. In these various embodiments, the system or apparatus determines what timing parameters (such as phase offsets) are appropriate based on how the components of the system perform, as measured by the system itself.

Figure 4:
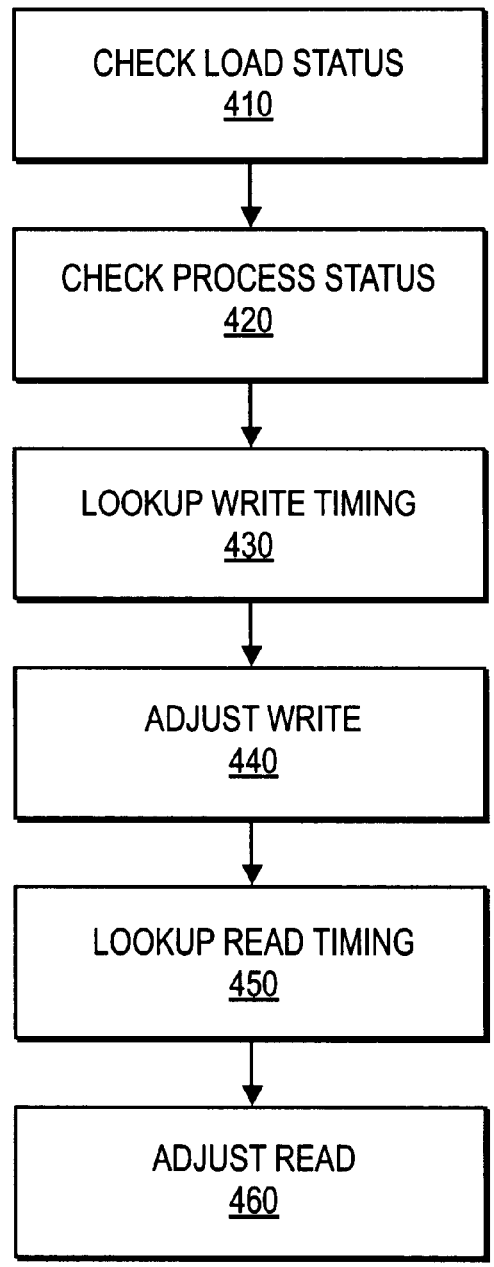
FIG. 4 illustrates an embodiment of a process.

FIG. 4 illustrates an embodiment of a process. In one embodiment, this process may be used to adjust clock settings in a system prior to or during operation of the system. At block 410, load status of the system (such as the number of active memory devices on a bus) is checked. At block 420, process status of the devices in the system (such as fast, slow, or a frequency rating for example) is checked. Based on this information, at block 430, write timing for the processor and memory of the system is checked within a table or other data structure available to the system. At block 440, values related to this timing information are stored as appropriate to implement timing for write operations in the system based on the number and type (processing type) of components involved. At block 450, read timing for the processor and memory of the system is checked in a similar manner to write timing, and at block 460, values associated with read timing are set or updated.

As will be appreciated, this process may be performed once, at initial startup, and thereby, processing for the system may be optimized for its configuration. It may be expected that the configuration, with respect to manufacture (processing) of the components and presence of a given number of components, will not change during operation of the system, i.e. that memory will only be added or removed during times when the system is off. Thus, performing the process as part of an initialization or boot routine for a system may be appropriate. Furthermore, typical systems already perform some form of diagnostic or discovery process to determine what is or is not present and/or functional in a system, so checking load and process status and then adjusting timing may easily be integrated into such a startup process. Additionally, known methods may be utilized to perform such checks, such as boundary scan of registers or identity codes of a part (component) for example. Furthermore, the process may also be performed on a periodic basis during operation of a system, allowing for update of timing parameters in response to changing operational conditions or perceived errors.

Figure 5:
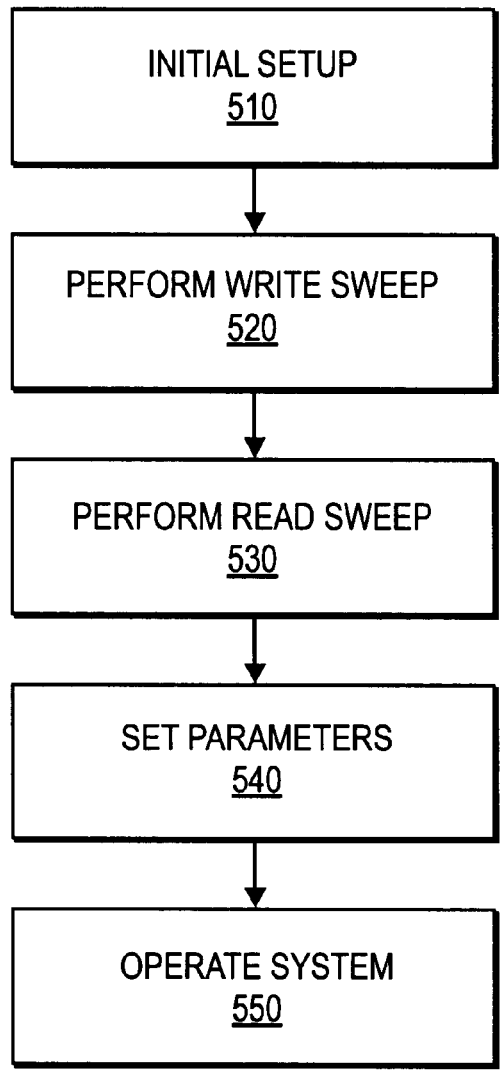
FIG. 5 illustrates an alternate embodiment of a process.

FIG. 5 illustrates an alternate embodiment of a process. At block 510, initial setup of a system begins, such as boot-up or initialization routines. At block 520, a write sweep is performed. The write sweep may include writing a variety of patterns to memory under a variety of operating conditions (such as different phase settings for the associated clocks). At block 530, a read sweep is performed. The read sweep may include reading the patterns from the memory under a variety of operating conditions (such as different phase settings for the associated clocks).

The results of the read may be compared with expected results, with failures in the read indicating either a failure due to the write sweep of block 520 or the read sweep of block 530 based on the operating conditions at the time of the read and write. These results as a whole may be analyzed, leading to an indication of what parameters are acceptable or desirable for operation of the system. At block 540, parameters related to the operation of the system for reads and writes are set based on this analysis. At block 550, the system is operated using these parameters. As will be appreciated, errors encountered during operation of the system may result in recalibration of the system using a similar method, or to restart (and thus recalibration) of the system.

Figure 6A:
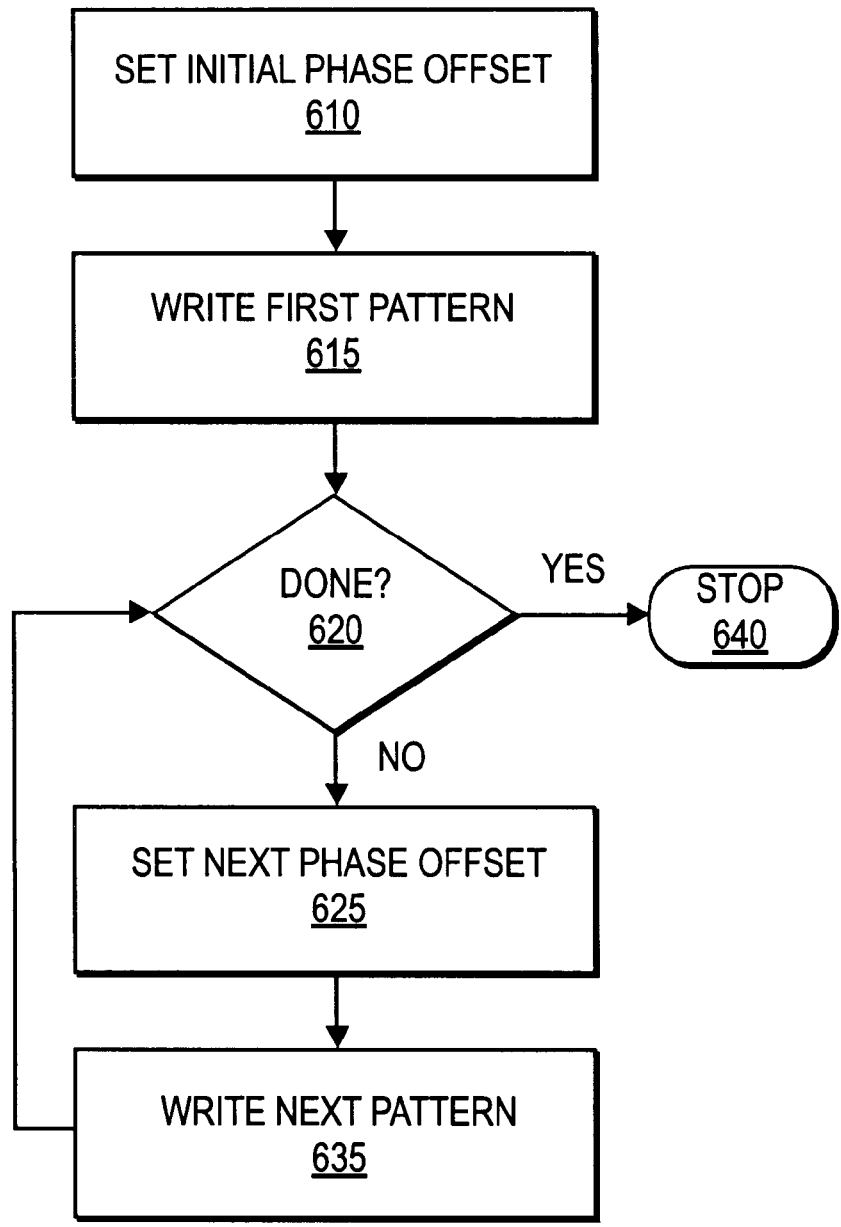
FIG. 6A illustrates an embodiment of a write process.

FIG. 6A illustrates an embodiment of a write process. Such a write process may be used in one embodiment to provide a write sweep. At block 610, an initial phase offset of a clock is set, such as setting a phase offset between a memory controller clock and a SDRAM clock. At block 615, a first pattern is written to a memory component utilizing the phase offset of block 610. Such a pattern may be specified based on expected worst or best case performance of a system, and a variety of patterns may be utilized, including but not limited to zebra ('01010101'), reverse-zebra ('10101010'), one-hot ('01000000'), all one ('11111111') and all zero ('00000000') patterns among others.

At block 620, a determination is made as to whether sufficient testing has been accomplished, such as by determining whether a final phase offset has been tested for example. If sufficient testing (writing) has been accomplished, the process flows to termination block 640 and completes. If more testing is in order, at block 625, a next phase offset is set for the clock(s) in question, and at block 635, a next pattern (which may be identical to or different from the first pattern) is written. Utilizing this process, it will be appreciated that a variety of different timing parameters may be tested. However, it will also be appreciated that the success of this testing depends on determining whether the contents of memory were properly written, by reading those contents from the memory in question.

Figure 6C:
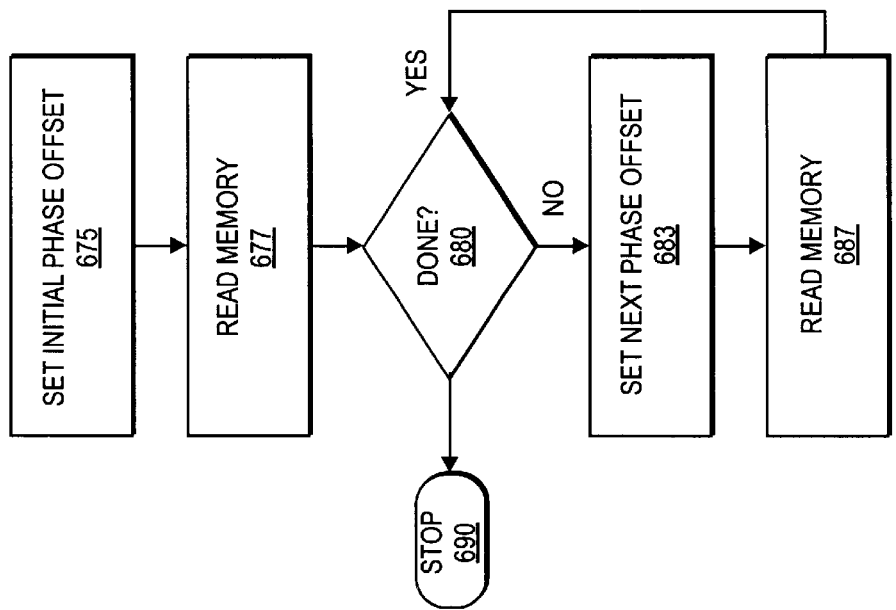
FIG. 6C illustrates an alternate embodiment of a read process.
Figure 6B:
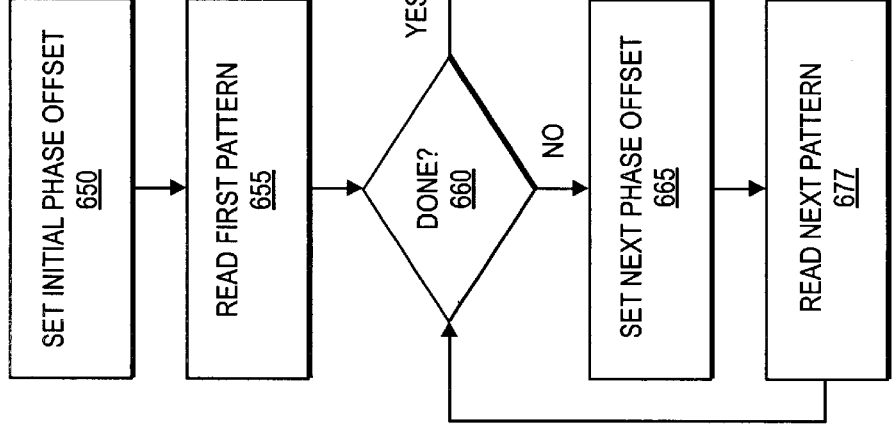
FIG. 6B illustrates an embodiment of a read process.

FIG. 6B illustrates an embodiment of a read process. Such a read process may be suitable for performing a read sweep or validating a write sweep or process. At block 650, an initial phase offset for a set of clocks (such as a processor clock and a read clock for example) is set. At block 655, a first read pattern (such as from a predetermined address or set of addresses) is read from a memory utilizing the clocks and timing parameters set at block 650. At block 660, a determination is made as to whether enough data has been read or enough reads have been performed to sufficiently test a system, such as by determining whether a final data address has been read for example.

If enough data has been read, the process proceeds to termination block 670 and stops. If more data is to be read, at block 665, a next phase offset is set between the clocks (or other appropriate signals for example) is set. At block 667, the next pattern to be read is read. As will be appreciated, each time data is read in a read process, that data may be compared to expected data to determine whether the read (or corresponding write) properly occurred. If data is valid for some read clock parameters (phase offsets), the write process for that data can be expected to have performed properly. If no read clock parameters result in proper data, the write process for that data can be expected to have failed, although this may result from the read process failing, too. Exact interpretation of data will vary depending on the underlying system design.

FIG. 6C illustrates an alternate embodiment of a read process. This read process may also be useful for either performing a read sweep or otherwise validating a write sweep. At block 675, an initial phase offset such as between a SDRAM clock and a read clock is set. At block 677, the memory previously written is read (for all data locations expected to hold data). At block 680, a determination is made as to whether other offsets should be tested is made.

If not, the process terminates at block 690. If so, at block 683 the next phase offset for the clocks in question is set, and at block 687 the memory is read again. As will be appreciated, reading all of the data in memory may take more time than reading a few data locations, but it may also provide a more robust test of timing parameters, or a quicker test of write sweep performance.

FIG. 7A illustrates a table of results of a test of a system. Rows 0–9 illustrate predefined portions of the memory, typically with a common set of write timing parameters for all data in a given row. Columns B, C and D represent a common system with varying read parameters depending on the row in question. Thus, the table of results represent a test performed according to the processes of FIGS. 6A and 6B. However, Column A represents the results of performing a write sweep, without taking into account read timing parameters. Thus, it becomes apparent that data from rows 0, 1, 7, 8 and 9 will fail under any read timing parameters.

Column B may be consistent with a first system having suitable performance under timing parameter sets corresponding to rows 4, 5 and 6, suggesting that one of those corresponding timing parameter sets should be used for both reading and writing data in the first system. Similarly, Column C may be consistent with a second system having suitable performance under timing parameter sets corresponding to rows 2, 3, 4, 5 and 6, suggesting that one of those corresponding timing parameter sets should be used for both reading and writing data in the second system. Moreover, Column D may be consistent with a third system having suitable performance under timing parameter sets corresponding to rows 2 and 3, suggesting that one of those corresponding timing parameter sets should be used for both reading and writing data in the third system. Note that the variations in results may be expected to result primarily from some combination of processing variations in the components of the systems and configuration variations of the systems. It will be appreciated that other sources of variations may arise, such as but not limited to variations in power supply available in the systems for example.

FIG. 7B illustrates another table of results of a test of a system. Similarly, each of rows 0–7 represent common write timing conditions or parameters. Column A represents write data results without respect to read data timing conditions. Column B represents read data results for a first system, and Column C represents read data results for a second system. Note that the data eyes for reading and writing result in only one set of suitable timing parameters for the second system. In reality, the timing parameters for the second system may be fine for the read timing related to row 2, but since the write timing failed, this is not apparent.

Figure 8A:
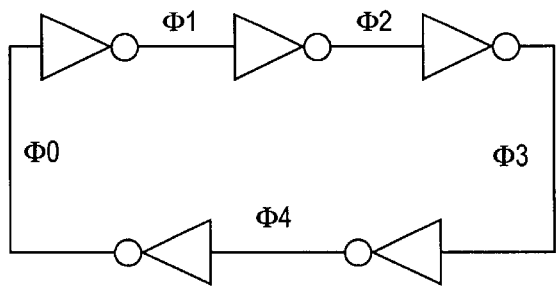
FIG. 8A illustrates an embodiment of a ring oscillator.

FIG. 8A illustrates an embodiment of a ring oscillator. Each of five phases ($\Phi 0$, $\Phi 1$, $\Phi 2$, $\Phi 3$, $\Phi 4$) of a clock is generated at the output of an inverting buffer, and those phases are then fed as inputs to the next inverting buffer in the ring. Thus, five phases of a clock are generated, with a reasonable expectation that the phase offsets are nearly equal between any two adjacent phases of the clock, provided the buffers have similar sizes, structures, and similar connecting conductors.

Figure 8B:
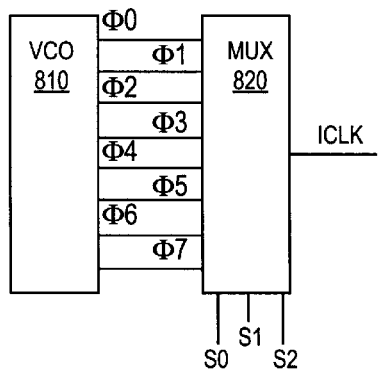
FIG. 8B illustrates an embodiment of a system.

FIG. 8B illustrates an embodiment of a system. This system may be utilized to provide eight phases of a clock, utilizing a VCO (Voltage Controlled Oscillator) 810. An internal clock (ICLK) may be used by selecting one of the eight phases ($\Phi 0$, $\Phi 1$, $\Phi 2$, $\Phi 3$, $\Phi 4$, $\Phi 5$, $\Phi 6$, $\Phi 7$) using select bits S0, S1 and S2 of multiplexer (MUX) 820. A variety of multiplexers may be coupled to the outputs of VCO 810, allowing for selection of multiple clock phases for different portions of circuitry. As will be appreciated, the VCO 810 may be formed using structures or circuits well known to those skilled in the art.

Figure 8C:
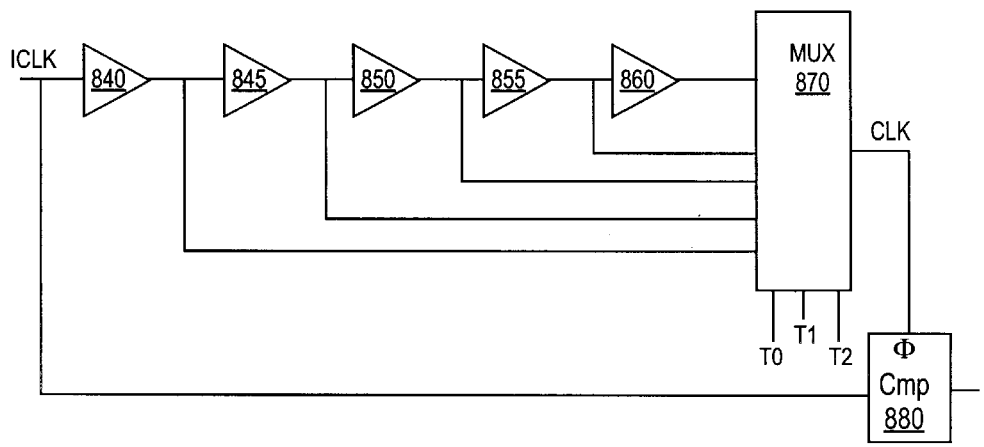
FIG. 8C illustrates an alternate embodiment of a system.

FIG. 8C illustrates an alternate embodiment of a system. An internal clock ICLK is fed through a series of non-inverting buffers (840, 845, 850, 855, 860), with the output of each non-inverting buffer coupled to a multiplexer (MUX) 870. Selection of one of these outputs of the non-inverting buffers for output as a signal CLK from the MUX 870 may be accomplished using selection bits T0, T1 and T2. Note that it may be suitable to compare the phase of the CLK signal to the ICLK signal using phase comparator 880.

Combining the embodiments of FIGS. 8B and 8C, a system may be designed allowing for both phase offsets between clocks (as determined from the clock selected at MUX 820 as ICLK, and trim offsets between the phase offsets, as determined by selection of an output to MUX 870. More will be described later with respect to the relationships between phase and trim offsets. Preferably, trim offsets allow for selection of phase differences in clock signals intermediate to any phase offsets available. Thus, by selecting the proper phase and trim offset, a fine granularity of phase differential between two clock signals derived from a common clock signal may be achieved.

Figure 9:
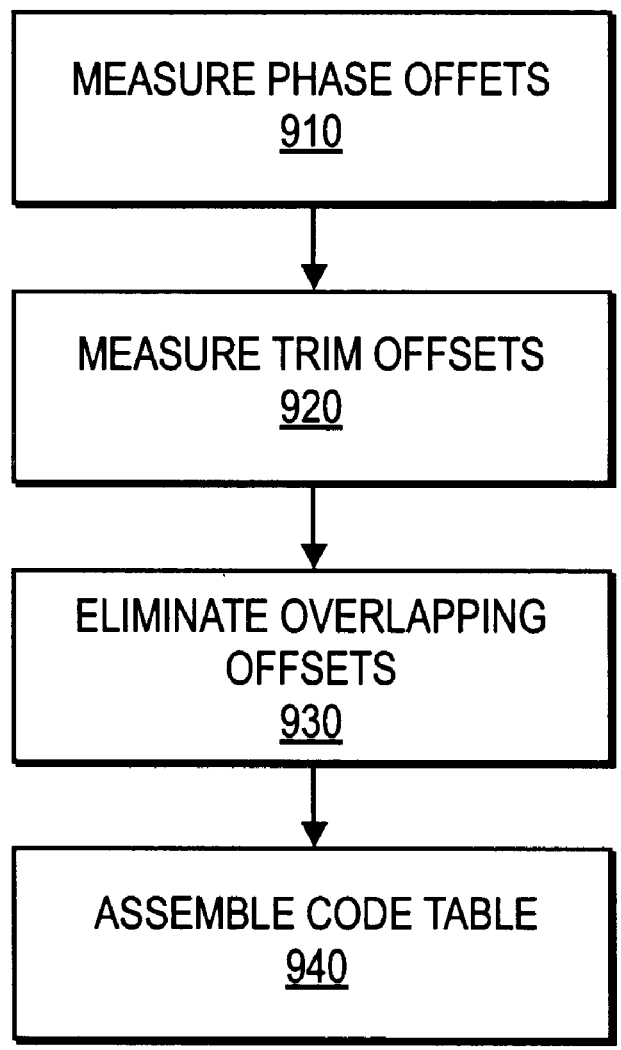
FIG. 9 illustrates an embodiment of a process.

FIG. 9 illustrates an embodiment of a process. At block 910, phase offsets between clock signals are measured, determining which phase offsets (and corresponding phase differences) are available. At block 920, trim offsets between trim offsets related to a given phase offset are measured, determining what trim offsets (and corresponding phase differences) are available. If some of these offsets overlap due to some processing or other variation, those offsets (typically trim offsets) are eliminated at block 930 from the available offsets which a system may choose for operating clock parameters. At block 940, a code table of available phase and trim offsets is assembled for use in choosing trim and phase settings for timing parameters.

Figure 10A:
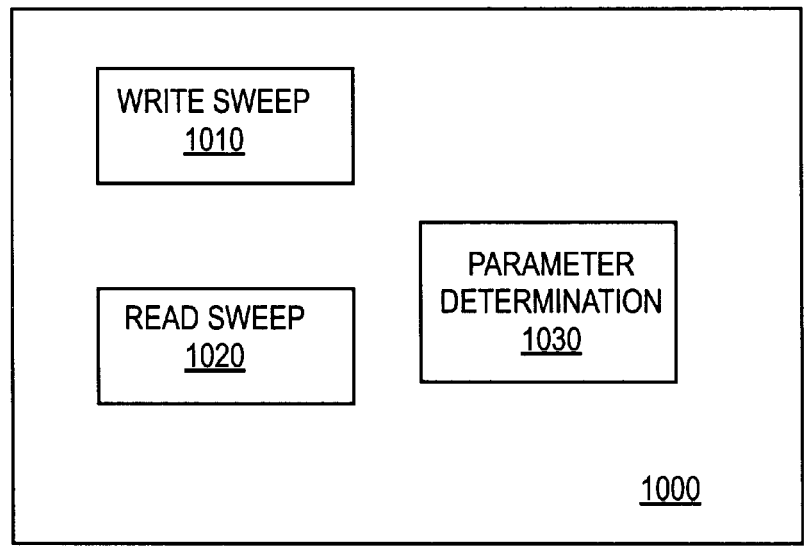
FIG. 10A illustrates an embodiment of a machine-readable medium.

FIG. 10A illustrates an embodiment of a machine-readable medium. Medium 1000 and media in general may include a single medium or multiple media used in conjunction. Included are write sweep component 1010, read sweep component 1020 and parameter determination component 1030. As will be appreciated, each component of a medium may be composed of executable instructions which, when executed by a processor or machine, cause the processor or machine to perform a method. Each component of a medium may also be composed of logic, which, given suitable inputs and outputs, perform the indicated function. The inputs and outputs in question may be adaptable to a given system, and may be as simple as an activation and power input and outputs suitable to accomplish the function in question.

Thus, the write sweep component 1010 may be expected to perform a write sweep of memory over a range of timing parameters for example. Similarly, the read sweep component 1020 may be expected to perform a read sweep over a range of timing parameters for example. Moreover, the parameter determination component 1030 may be expected to analyze results of the read and write sweeps to determine what timing parameters are suitable for operation of the system in question.

Figure 10B:
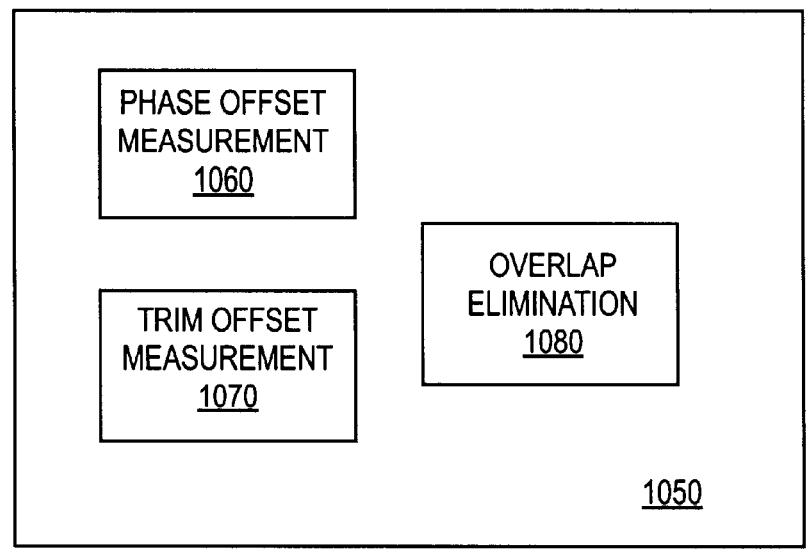
FIG. 10B illustrates an alternate embodiment of a machine-readable medium.

FIG. 10B illustrates an alternate embodiment of a machine-readable medium. Medium 1050 includes phase offset measurement component 1060, trim offset measurement component 1070, and overlap determination component 1080. Phase offset measurement component 1060 may be expected to measure phase offsets between a set of clock signals derived from a common base clock. Trim offset measurement component 1070 may be expected to measure phase offsets between trim settings available for a set of clock signals. Overlap determination component 1080 may be expected to determine overlap of phase and trim settings, such as a trim setting for a first phase overlapping a trim setting for a second phase for example.

Figure 11A:
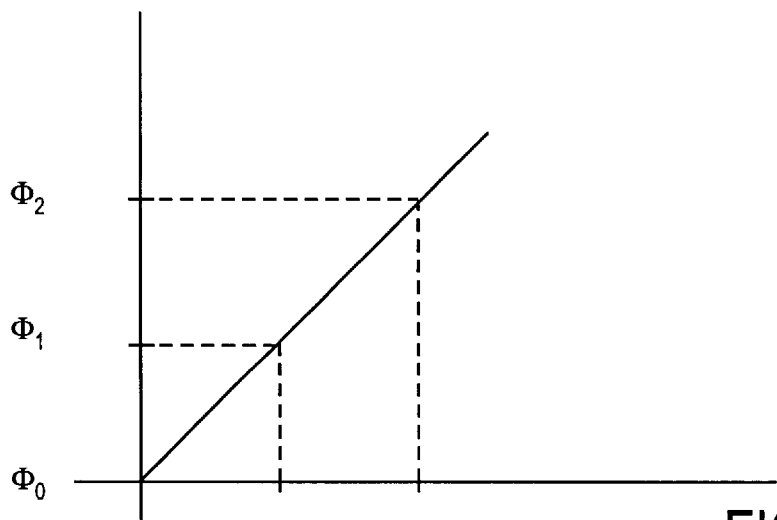
FIG. 11A illustrates a plot of phase offset against trim setting.
Figure 11B:
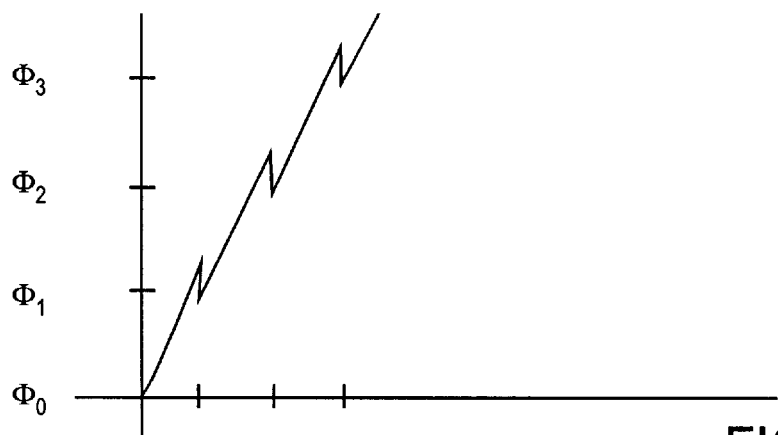
FIG. 11B illustrates another plot of phase offset against trim setting.
Figure 11C:
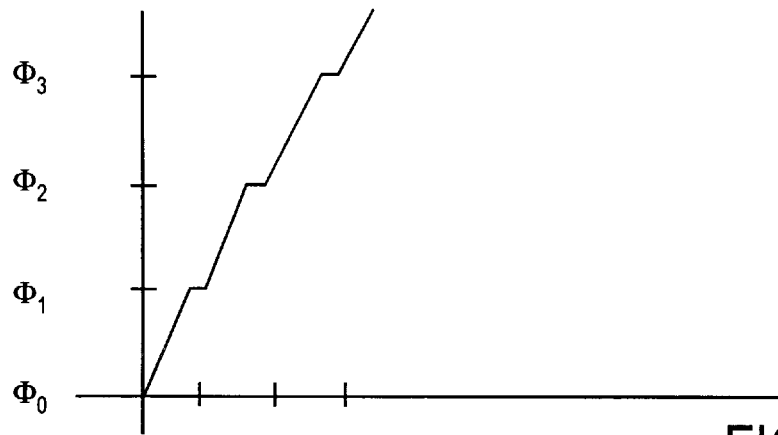
FIG. 11C illustrates yet another plot of phase offset against trim setting.

FIG. 11A illustrates a plot of phase offset against trim setting. Preferably, a linear plot such as this will result, with each trim setting having a regular phase difference with its preceding and succeeding trim settings. FIG. 11B illustrates another plot of phase offset against trim setting. Given the reality of unpredictable variations in processing of devices, trim offsets from a first phase (such as Φ1 for example) may overlap with trim offsets from a second phase (such as Φ2 for example). FIG. 11C illustrates yet another plot of phase offset against trim setting. Those trim offsets which overlap with trim offsets from a succeeding phase are eliminated for purposes of choosing a trim offset, thus allowing for a monotonic curve of phase and trim setting versus resulting phase offset.

Figure 12:
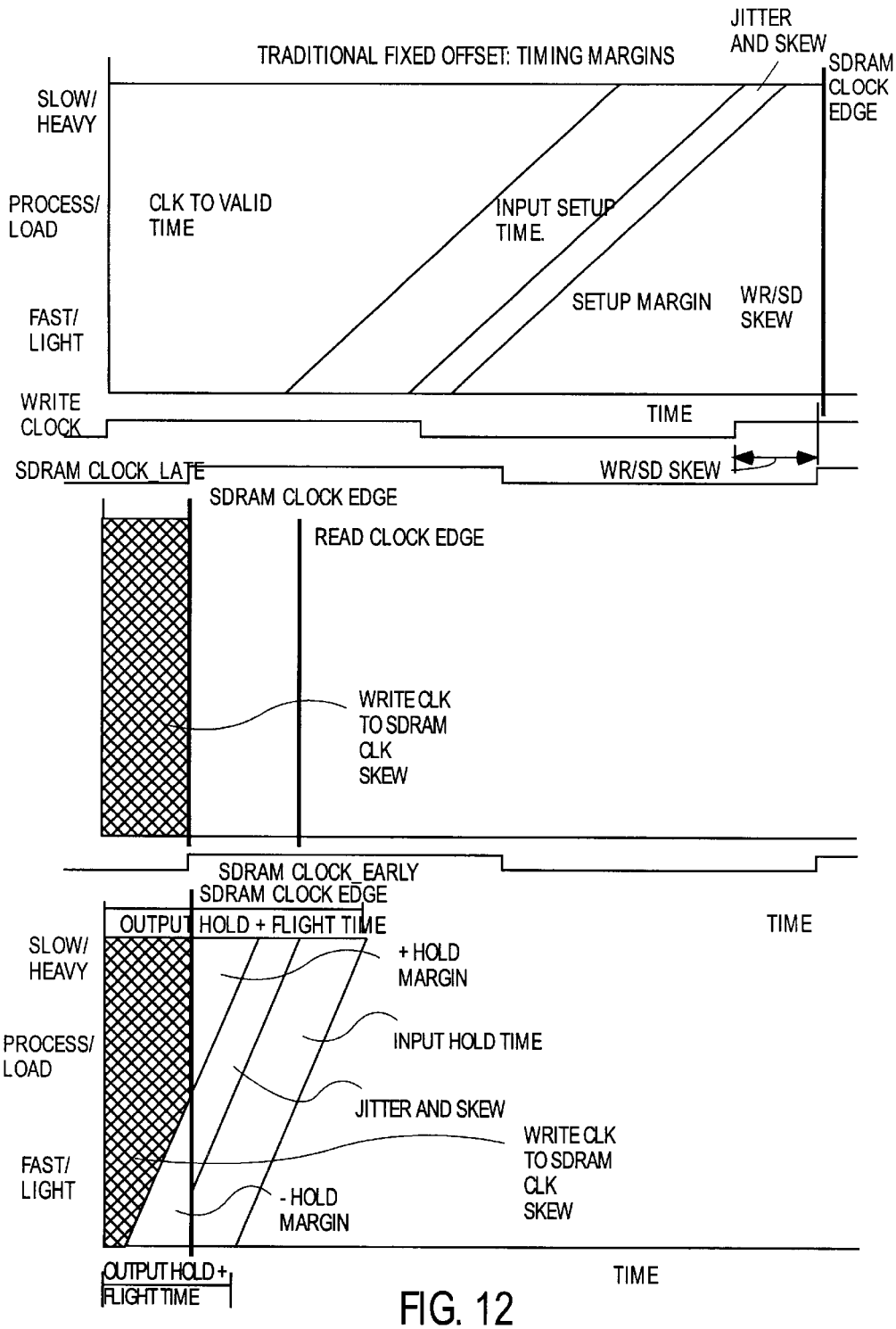
FIG. 12 illustrates a set of traditional timing margins.

FIG. 12 illustrates a set of traditional timing margins. This illustration has five different parts, each of which lines up along a time axis with the other parts. For the first part, in this example, a write clock is used along with an SDRAM clock, with the write clock supplied to a register which latches the values to be written to the SDRAM. The various regions illustrate the components of the timing relationship between the two clocks. The clock to valid time is illustrated in the first region, with its boundary representing the amount of time until the data is valid after the clock edge. Next, input setup time (to the SDRAM) is shown as a constant time in the next region. Next, margin for expected jitter and skew of various input and clock signals is accounted for by the next region. Finally, setup margin is represented by the remaining region, which has a narrow area (short time) for a slow process device with heavy loading on a bus, and a wide area (long time) for a fast process device with light loading on a bus. As was discussed previously, fast or slow devices due to processing variations may be characterized either by a supplier or by a manufacturer using such devices, thereby allowing for some determination of what range of performance is available for a given device. Light versus heavy loading on a bus is a design choice and thus may be determined and controlled in a manufacturing setting.

In the second part, the write clock and SDRAM clock__late are shown, with the skew or phase offset between the two signals illustrated. SDRAM clock__late refers to the latest or worst-case timing which is used for a slow process variation and heavy bus loading. Note that the SDRAM clock__late signal is the same as the SDRAM clock edge of the first part, and that this is the phase offset which may be adjusted between the two signals. As will be appreciated, in a traditional timing model, the SDRAM clock has a fixed value and fixed offsets relative to write and read clocks, such that the SDRAM clock, SDRAM clock__late and SDRAM clock__early (see below) will always be set to the same value. This fixed value or phase offset will be determined based on expected worst case timing margins.

In the third part of FIG. 12, skew or phase offsets between the write clock, the SDRAM clock, and the read clock are illustrated. Note that the read clock edge follows the SDRAM clock edge in this embodiment, allowing, for example, a register to latch data coming out of a SDRAM device performing a read operation.

In the fourth part of FIG. 12, the SDRAM clock is again reproduced, although it is now labeled as 'early', thereby indicating its setting for a fast process variation and light load. Note, however, that the SDRAM clock__early setting for a traditional timing model will not vary from the other SDRAM clock settings.

In the fifth part of FIG. 12, the components of the timing relationship for the read clock and SDRAM clock are illustrated, along with the skew (offset) between the SDRAM clock and write clock. Reading right to left, the input hold time (for the register) is illustrated as the first region. Next in the right to left order is anticipated jitter and skew of various inputs and clocks involved within the system. Next is the hold margin built into the system. Note that the hold margin may be positive (relative to the SDRAM clock edge) or negative. Moreover, note that the negative hold margin includes what would be jitter and skew or input hold time if that extends back to a point prior to the SDRAM clock edge.

As will be appreciated, data from the SDRAM must be held for a period of time after the read clock strobes to allow for latching by the register in question. Similarly, data to be written to the SDRAM must be provided with enough setup margin to allow for proper latching of data by the SDRAM. The phase offsets for the write and read clocks relative to the SDRAM clock were all chosen based on the worst case timing (in this case a slow process variation and heavy bus load). However, this may not be the situation in a given system, allowing for faster operation in some cases.

Moreover, it will be appreciated that often a good data eye of useful width exists on the bus, but that the location of the data eye relative to a clock edge tends to shift with process variations in the components involved. Similarly, the data eye may shift or shift and change width (either narrow or widen) depending on loading on a bus. The loading effects may manifest in terms of a simple delay or in terms of slower rise and fall times which potentially can shrink the data eye. It will be appreciated that the data eye typically provides a period of time relative to a clock edge during which data is suitable, and it is bounded by the worst case and best case timing for the system. The fact that this data eye tends to have a fairly constant width and simply shifts around the clock edge allows one to adjust the timing to take advantage of this width and run a system at faster speeds. In one embodiment, a set of systems designed based on worst case timing to use a 100 MHz clock were tuned across process variation and bus loading to use a 133 MHz clock regardless of the loading and process variations of the specific components.

Figure 13:
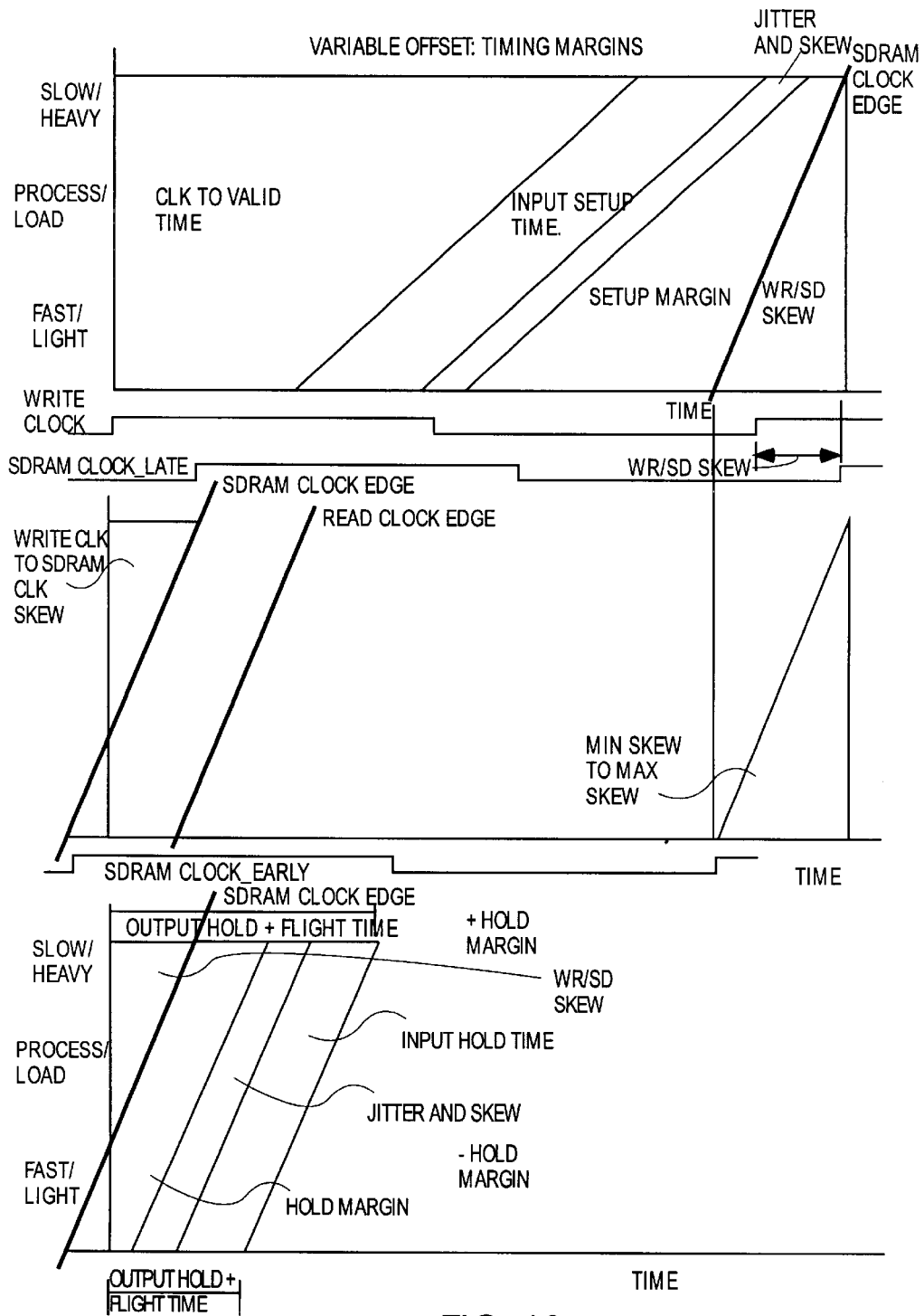
FIG. 13 illustrates a first set of variable timing margins.

FIG. 13 illustrates a first set of variable timing margins. Comparing FIG. 13 to FIG. 12, changes in each of the part except for the second are apparent. In the first part, the SDRAM clock edge may be moved relative to the write clock edge depending on the process variation and bus loading in the system when testing occurs, thus allowing for tuning of the SDRAM clock relative to the write clock and potential operation at a higher clock frequency. In the third part, the SDRAM clock edge is shown as tunable depending on process variation and bus loading. In this embodiment, the offset from the SDRAM clock to the read clock is kept constant, while the skew between the SDRAM clock and the write clock is illustrated as varying based on process variation and loading. In the fourth part, the early SDRAM clock is illustrated, with the SDRAM clock edge set for a system with fast process variation and light bus loading. Finally, the constant phase offset and components thereof between the SDRAM clock and the read clock are illustrated in the fifth part.

Figure 14:
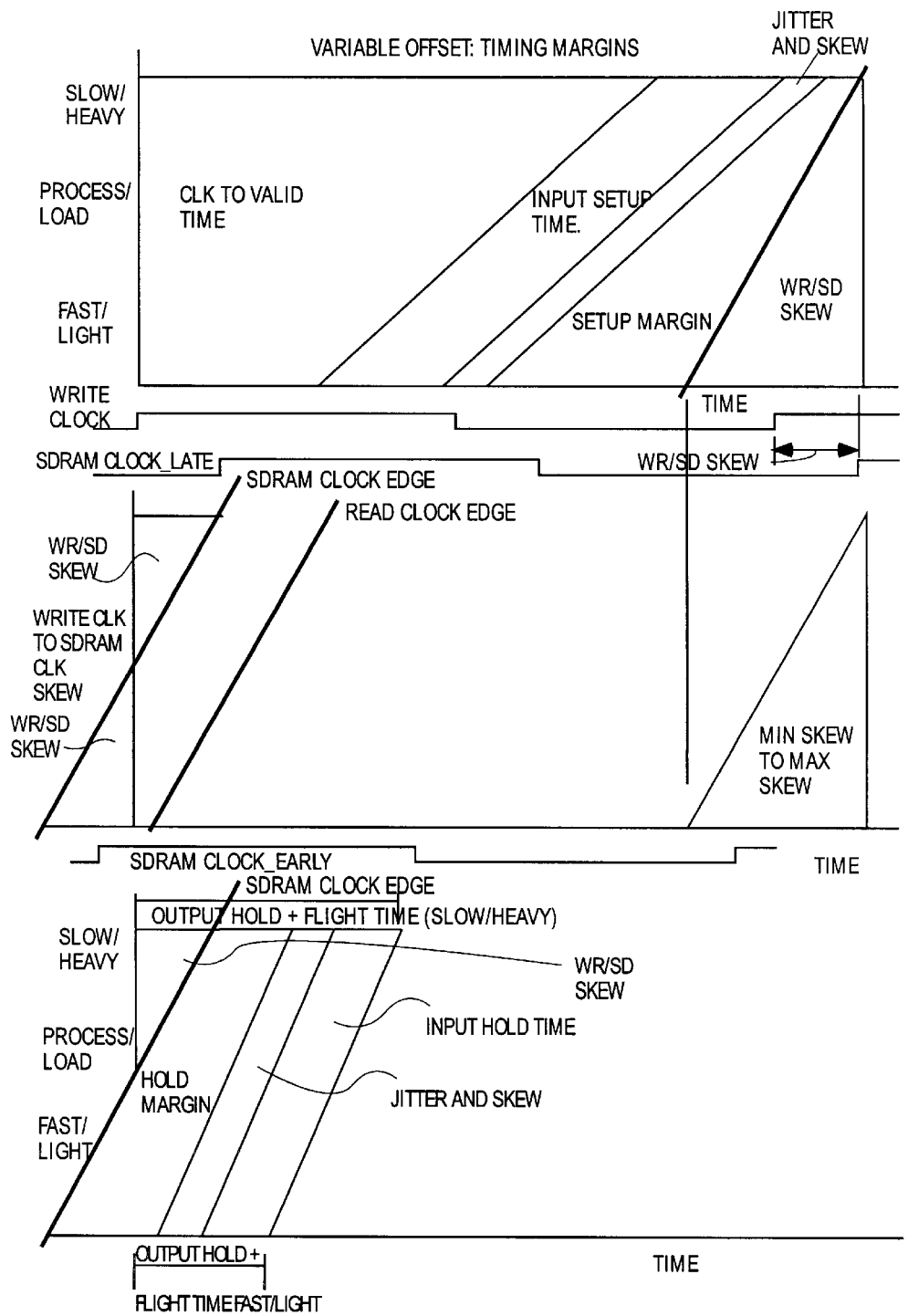
FIG. 14 illustrates a second set of variable timing margins.

FIG. 14 illustrates a second set of variable timing margins. Comparing FIG. 14 to FIG. 13, it will be apparent that FIG. 14 illustrates timing margins with variable phase offsets between the write clock and the SDRAM clock, and between the SDRAM clock and the read clock. In particular, in the fifth part of FIG. 14, the time (width) between the SDRAM clock edge and the read clock edge (between the jitter and skew and the hold time regions) varies depending on process variation and bus loading. Thus, adjustment of phase offsets between the three clock edges is utilized to provide potential performance enhancements relative to worst case timing.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 2 may be integrated into components, or may be subdivided into components. Similarly, the blocks of FIG. 4 or 5 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. An apparatus comprising:
   a memory controller;
   a clock signal generator coupled to the memory controller, the clock signal generator coupled to supply a first clock signal and a second clock signal to the memory controller;
   a first memory bank coupled to the memory controller and to the clock signal generator, the first memory bank to receive a third clock signal from the clock signal generator;
   and wherein the clock signal generator to generate the first clock signal, the second clock signal and the third clock signal from a single clock source, the first clock signal having a first predetermined phase offset relative to the third clock signal, the second clock signal having a second predetermined phase offset relative to the third clock signal, the first predetermined phase offset determined base on performance of components of the apparatus as determined by the apparatus, the second predetermined phase offset determined based on performance of components of the apparatus as determined by the apparatus.

2. The apparatus of claim 1, further comprising:
   an accelerated graphics port coupled to the memory controller and coupled to the clock signal generator, the accelerated graphics port to receive a fourth clock signal from the clock signal generator.

3. The apparatus of claim 1, further comprising:
   a second memory bank coupled to the memory controller and coupled to the clock signal generator, the second memory bank to receive the third clock signal from the clock signal generator.

4. The apparatus of claim 3, further comprising:
   a third memory bank coupled to the memory controller and coupled to the clock signal generator, the third memory bank to receive the third clock signal from the clock signal generator; and
   a fourth memory bank coupled to the memory controller and coupled to the clock signal generator, the fourth memory bank to receive the second clock signal from the clock signal generator.

5. The apparatus of claim 4 further comprising an I/O bridge.

6. A method comprising:
   determining load status of a bus of a system;
   determining process variation status of components of the system, the components coupled to the bus;
   looking up timing parameter values based on the load status and the process variation status; and
   adjusting timing parameters of the system based on the timing parameter values looked up.

7. The method of claim 6 further comprising:
   repeating the determining load status, the determining process variation status, the looking up timing parameter values and the adjusting timing parameters periodically.

8. The method of claim 6 wherein:
   the timing parameters and the timing parameter values relate to write timing of writes to memory of the system.

9. The method of claim 6 wherein:
the timing parameters and the timing parameter values relate to write timing of writes and read timing of reads to and from memory of the system.

10. An apparatus comprising:
a first subsystem;
a second subsystem coupled to the first subsystem;
a means for generating a set of clocks including a first clock, a second clock and a third clock, each clock of the set of clocks derived from a common clock, each clock of the set of clocks having a phase offset relative to the other clocks of the set of clocks, the means for generating coupled to supply the first clock to the first subsystem and coupled to supply the second clock and the third clock to the second subsystem; and
a means for adjusting the phase offsets of the clocks based on characteristics of the first subsystem and the second subsystem.

11. An apparatus comprising:
a first subsystem;
a second subsystem coupled to the first subsystem;
a clock signal generator coupled to the first subsystem and coupled to the second subsystem, the clock signal generator to supply a first clock to the first subsystem and to supply a second clock to the first subsystem and to supply a third clock to the second subsystem, each of the first clock, the second clock and the third clock derived from a common clock, the first clock having a first predetermined phase offset relative to the third clock, the second clock having a second predetermined phase offset relative to the third clock, the first predetermined phase offset and the second predetermined phase offset adjustable based on performance characteristics of the first subsystem and performance characteristics of the second subsystem as determined by the apparatus.

12. The apparatus of claim 11 wherein the clock signal generator to receive control signals from the first subsystem.

13. The apparatus of claim 11 wherein the first phase offset adjusted to account for fast performance of the first subsystem.

14. The apparatus of claim 11 wherein the first phase offset adjusted to account for fast performance of the second subsystem.

15. The apparatus of claim 14 wherein the first phase offset adjusted to account for fast performance of the first subsystem.

16. The apparatus of claim 11 wherein the first phase offset and the second phase offset adjusted to account for fast performance of the first subsystem.

17. The apparatus of claim 11 wherein the first phase offset and the second phase offset adjusted to account for fast performance of the second subsystem.

18. The apparatus of claim 17 wherein the first phase offset and the second phase offset adjusted to account for fast performance of the first subsystem.

19. The apparatus of claim 11 wherein the first phase offset adjusted to account for slow performance of the first subsystem.

20. The apparatus of claim 11 wherein the first phase offset adjusted to account for slow performance of the second subsystem.

21. The apparatus of claim 20 wherein the first phase offset adjusted to account for fast performance of the first subsystem.

22. The apparatus of claim 20 wherein the first phase offset adjusted to account for slow performance of the first subsystem.

23. The apparatus of claim 11 wherein the first phase offset and the second phase offset adjusted to account for slow performance of the second subsystem.

24. The apparatus of claim 23 wherein the first phase offset and the second phase offset adjusted to account for fast performance of the first subsystem.

25. The apparatus of claim 23 wherein the first phase offset and the second phase offset adjusted to account for slow performance of the first subsystem.

26. A method comprising:
sweeping writes to a memory of a system over a first set of timing parameter values;
determining which timing parameter values of the first set of timing parameter values resulted in successful writes to the memory of the system;
setting parameters within the system to timing parameter values which resulted in successful writes to the memory of the system.

27. The method of claim 26 further comprising:
sweeping reads from a memory of a system over a second set of timing parameter values;
determining which timing parameter values of the second set of timing parameter values resulted in successful reads to the memory of the system;
and wherein setting parameters further includes setting parameters within the system to timing parameter values which resulted in successful reads from the memory of the system.

28. A method comprising:
sweeping writes to a memory of a system over a first set of timing parameter values;
sweeping reads from a memory of a system over a second set of timing parameter values;
determining which timing parameter values of the second set of timing parameter values resulted in successful reads to the memory of the system;
determining which timing parameter values of the first set of timing parameter values resulted in successful writes to the memory of the system;
setting parameters within the system to timing parameter values of the first and second sets which resulted in successful write to and reads from the memory of the system.

29. A machine-readable medium embodying a set of instructions which, when executed by a processor, cause the processor to perform a method, the method comprising:
sweeping writes to a memory of a system over a first set of timing parameter values;
determining which timing parameter values of the first set of timing parameter values resulted in successful writes to the memory of the system;
setting parameters within the system to timing parameter values which resulted in successful writes to the memory of the system.

30. The machine-readable medium of claim 29 further embodying instructions, which when executed by the processor, cause the processor to perform the method further comprising:
sweeping reads from a memory of a system over a second set of timing parameter values;
determining which timing parameter values of the second set of timing parameter values resulted in successful reads to the memory of the system;
and wherein setting parameters further includes setting parameters within the system to timing parameter values which resulted in successful reads from the memory of the system.

31. A machine-readable medium embodying a set of instructions which, when executed by a processor, cause the processor to perform a method, the method comprising:

measuring phase offsets of a set of clocks of a system, each clock of the set of clocks derived from a common clock; and assembling a code table having a relationship between a set of codes and a corresponding set of phase offsets.

32. The machine-readable medium of claim 31 further embodying instructions, which when executed by the processor, cause the processor to perform the method further comprising:

measuring a set of trim offsets of the set of clocks;

and wherein assembling the code table comprises assembling a code table having a relationship between the set of codes and a corresponding set of phase offsets and trim offsets.

* * * * *